United States Patent
Motoori et al.

(10) Patent No.: US 7,261,510 B2
(45) Date of Patent: Aug. 28, 2007

(54) OVERHEAD TRAVELLING CARRIAGE SYSTEM

(75) Inventors: Yoichi Motoori, Komaki (JP); Akito Tai, Kagamigahara (JP); Hisanori Matsumoto, Inuyama (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 161 days.

(21) Appl. No.: 10/735,733

(22) Filed: Dec. 16, 2003

(65) Prior Publication Data

US 2004/0149672 A1    Aug. 5, 2004

(30) Foreign Application Priority Data

| Feb. 3, 2003 | (JP) | ............................. 2003-025766 |
| Feb. 3, 2003 | (JP) | ............................. 2003-025767 |
| Feb. 10, 2003 | (JP) | ............................. 2003-031895 |

(51) Int. Cl.
*H21L 21/677* (2006.01)
(52) U.S. Cl. ...................... 414/281; 414/940
(58) Field of Classification Search ................ 414/281, 414/940
See application file for complete search history.

(56) References Cited

U.S. PATENT DOCUMENTS

| 3,240,365 | A | * | 3/1966 | King ........................... 414/273 |
| 4,389,157 | A | * | 6/1983 | Bernard et al. ............. 414/787 |
| 5,466,109 | A | * | 11/1995 | Iizuka ......................... 414/283 |
| 5,527,390 | A | * | 6/1996 | Ono et al. ................... 118/719 |
| 5,913,722 | A | * | 6/1999 | Katou et al. ................ 454/187 |
| 5,955,857 | A | * | 9/1999 | Kwon et al. ........... 318/568.11 |
| 5,980,183 | A | * | 11/1999 | Fosnight ................ 414/222.01 |
| 6,089,811 | A | * | 7/2000 | Watanabe et al. ........... 414/269 |
| 6,134,482 | A | * | 10/2000 | Iwasaki ....................... 700/121 |
| 6,519,502 | B2 | * | 2/2003 | Chao .......................... 700/213 |
| 6,582,182 | B2 | * | 6/2003 | Whalen ....................... 414/276 |
| 6,817,822 | B2 | * | 11/2004 | Tokunaga .................... 414/217 |
| 2002/0024647 | A1 | * | 2/2002 | Nakahara et al. ............. 355/53 |
| 2003/0053892 | A1 | * | 3/2003 | Lan et al. ................... 414/217 |

(Continued)

FOREIGN PATENT DOCUMENTS

JP    50-71074    6/1975

(Continued)

OTHER PUBLICATIONS

Japanese Office Action dated Apr. 25, 2006, issued in corresponding Japanese patent application No. 2003-025767.

(Continued)

*Primary Examiner*—Thomas J. Brahan
(74) *Attorney, Agent, or Firm*—Westerman, Hattori, Daniels & Adrian, LLP.

(57) ABSTRACT

The present invention provides an overhead travelling carriage system in which an overhead travelling carriage 110 is run along a running rail to convey a cassette 14 between processing devices 111. The overhead travelling carriage system is provided with an elevating space 8 for a platform 12 on which transfer means 51 is provided to transfer the cassette 14 and a storage space 10 in which a plurality of shelves are provided in a vertical direction to store cassettes 14. The elevating space and the storage space are arranged in a direction orthogonal to the running rail, as viewed from above. According to the present invention, the stocker requires a reduced space.

13 Claims, 7 Drawing Sheets

U.S. PATENT DOCUMENTS

2004/0091338 A1 * 5/2004 Kim .......................... 414/217

FOREIGN PATENT DOCUMENTS

| | | | |
|---|---|---|---|
| JP | 60-023206 A | 2/1985 | |
| JP | 60-138136 U | 9/1985 | |
| JP | 62-222905 A | 9/1987 | |
| JP | 1-121005 A | 8/1989 | |
| JP | 4-80107 | * | 4/1992 |
| JP | 04-186861 A | 7/1992 | |
| JP | 05-043015 | 2/1993 | |
| JP | 05-294441 | 11/1993 | |
| JP | 06-024508 A | 2/1994 | |
| JP | 07-187326 A | 7/1995 | |
| JP | 9-315521 | 12/1997 | |
| JP | 11-029207 | 2/1999 | |
| JP | 11-214472 A | 8/1999 | |
| JP | 3067656 | 5/2000 | |
| JP | 2000-195919 A | 7/2000 | |
| JP | 2000-211706 | 8/2000 | |
| JP | 2000-264405 A | 9/2000 | |
| JP | 2001-31216 | 2/2001 | |
| JP | 2001-031216 A | 2/2001 | |
| JP | 2001-127134 A | 5/2001 | |
| JP | 2001-213588 A | 8/2001 | |
| JP | 2002-60011 | 2/2002 | |
| JP | 2002-060011 A | 2/2002 | |
| JP | 2002-255314 A | 9/2002 | |

OTHER PUBLICATIONS

Japanese Office Action dated May 1, 2006, issued in corresponding Japanese patent application No. 2003-025766.

Japanese Office Action dated Apr. 25, 2006, issued in corresponding Japanese patent application No. 2003-031895.

Office Action from the Japanese Patent Office dated Jul. 4, 2006, in the corresponding Japanese patent application (2003-025767).

Office Action from the Japanese Patent Office dated Jul. 4, 2006 in the corresponding Japanese patent application (2003-025766).

* cited by examiner

OVERHEAD TRAVELLING CARRIAGE SYSTEM

FIELD OF THE INVENTION

The present invention relates to an overhead travelling carriage system comprising a combination of a stocker in which articles are temporarily stored and an overhead travelling carriage.

BACKGROUND OF THE INVENTION

The Japanese Patent Publication No. 3067656 discloses the temporary storage of articles achieved by suspending a rack from a running rail for an overhead travelling carriage. However, it is difficult for the rack suspended from the running rail to store a large number of articles. In some cases, after an overhead travelling carriage system has been installed, productivity is increased by improving production facilities or increasing the availability factor of the facilities. In these case, it is necessary to enhance the ability to store articles, but available spaces are used for the improvement of the production facilities and the like. Consequently, there remain no spaces to install a stocker. Then, it is contemplated that a rack suspended from the running rail may be introduced. However, such a rack disadvantageously has a small holding capacity.

It is a basic object of the present invention to improve the ability of an overhead travelling carriage system to store articles using a stocker which can deliver and receive articles to and from an overhead travelling carriage and which can store a larger number of articles in a narrow space.

SUMMARY OF THE INVENTION

According to the present invention, there is provided an overhead travelling carriage system in which an overhead travelling carriage is run along a running rail to convey an article between processing devices, the system being characterized in that a stocker is disposed so as to freely deliver and receive an article to and from the overhead travelling carriage, the stocker being provided with an elevating space for a platform on which a transfer device is provided to transfer an article and a storage space in which a plurality of shelves are provided in a vertical direction to store articles, the elevating space and the storage space being arranged in a direction orthogonal to a direction in which the overhead travelling carriage runs, as viewed from above.

Preferably, among the processing devices to which an article is conveyed, the stocker is disposed close to one of these processing devices which requires a relatively short time for processing. Preferably, the stocker is disposed upstream of and close to the processing device requiring a relatively short time for processing.

Particularly preferably, the stocker is disposed in a gap between the processing devices. Furthermore, preferably, the stocker is provided with wheels at its bottom so as to be movable. In this case, the stocker can be properly installed at a position where a sufficient number of articles cannot be stored.

Preferably, the elevating space is provided immediately below the running rail.

Preferably, an opening is formed at a top of the elevating space to transfer an article directly between the overhead travelling carriage and the platform.

More preferably, the platform is provided with a transfer device to transfer an article to and from the storage space, and the transfer device is provided with an engaging member that engages with a bottom surface of an article unloaded from the overhead travelling carriage, in order to position the article.

Preferably, a longitudinal direction of the stocker is orthogonal to the running direction of the overhead travelling carriage.

Preferably, guide members are provided at laterally opposite sides of the platform to guide corresponding sides of an article unloaded from the overhead travelling carriage.

Preferably, rollers are provided in a lower part of each of the guide members to support the load of an article, and follower rollers are provided on each of the shelves in the storage space.

More preferably, the transfer device is provided in a central portion between the guide members on the platform.

Preferably, the transfer device is provided with a fixed guide fixed to the platform, a moving guide that moves forward and rearward relative to the fixed guide, and the engaging member that moves forward and rearward relative to the moving guide. The fixed guide and the moving guide are preferably linear guides. In particular, when the moving guide is arranged on the fixed guide and the engaging member is arranged on the moving guide, the load of the engaging member can be received by the underlying moving guide, and the load of the moving guide can be received by the underlying fixed guide. The engaging member has only to engages with the bottom surface of the article to move it forward and rearward. The engaging member does not require a sufficient area in which the article is stably placed.

Preferably, the transfer device is moved forward and rearward relative to the fixed guide by using a motor to drive an endless first transmission member and attaching the moving guide to the first transmission member. Moreover, the engaging member is moved forward and rearward relative to the moving guide by providing a second transmission member having one end fixed to the platform, an intermediate portion guided by a guide wheel provided at a tip of the moving guide, and the other end fixed to the engaging member, and third transmission member having one end fixed to the platform, an intermediate portion guided by a guide wheel provided at a proximal end of the moving guide, and the other end fixed to the engaging member. Here, the first transmission member is preferably arranged on the platform parallel with the fixed guide. The second transmission member and the third transmission member are preferably arranged, for example, parallel with the moving guide. Moreover, the first to third transmission members are composed of, for example, belts such as timing belts or chains.

In the present invention, the plurality of shelves are arranged in the vertical direction to enable a storage space to be effectively utilized. In particular, since the longitudinal direction of the stocker is orthogonal to the running direction of the overhead travelling carriage, a large number of articles can be stored in a small space below the running rail. Thus, for example, in improving the ability to produce articles to be conveyed, it is possible to, for example, improve the ability of an existing overhead travelling carriage system to store articles and thus its ability to convey and produce articles.

Articles can be stored close to the processing device requiring a relatively short time for processing. This increases the throughput of such a processing device.

Furthermore, since the stocker is disposed in the gap between the processing devices, the stocker can be disposed in a small gap. Consequently, for example, in installing additional processing devices, changing the layout of the processing devices, or changing a production schedule, the stocker can be flexibly disposed to improve the storing ability.

Moreover, since the elevating space is arranged immediately below the running route of the overhead travelling carriage, it is unnecessary to provide stations projecting from the stocker, thus saving space.

The opening is formed at the top of each elevating space in the stocker so that the article can be transferred directly between the overhead travelling carriage and the platform. Thus, whether the transfer device provided on the overhead travelling carriage transfers the article in a horizontal or vertical direction, the article can be transferred directly between the overhead travelling carriage and the platform. In particular, if the transfer device on the overhead travelling carriage transfers the article in the vertical direction, the elevating space can be arranged immediately below the running route of the overhead travelling carriage. This eliminates the need for stations projecting from the stocker, thus saving spaces.

Furthermore, the article unloaded from the overhead travelling carriage is positioned using the engaging member provided on the transfer device of the platform. Since the engaging member engages with the bottom surface of the article, the article can be moved forward or rearward relative to the transfer device for transfer.

Moreover, the right and left guides of the platform can regulate the lateral position of the article to reliably position the article unloaded from the overhead travelling carriage. Thus, even if the stocker is not sufficiently accurately attached to the running rail for the overhead travelling carriage or the platform is not sufficiently accurately positioned, the article can be surely transferred between the overhead travelling carriage and the platform.

On the platform, the rollers provided on the guide member can support the load of the article. During a transfer, the article can be supported both by the follower rollers in the storage space and by the rollers on the guide member. Thus, the transfer device need not be very rigid, and a simple driving mechanism can be used for the transfer device. This serves to reduce the weight of the platform. Moreover, during a transfer, no offset loads are imposed on the platform. As a result, the platform is not inclined forward or rearward and can be easily guided forward and rearward. Furthermore, the transfer device is arranged in the central portion between the guide members on the platform. This prevents the article on the rollers from being inclined during a transfer.

The transfer device is composed of the fixed guide, the moving guide, and the engaging member, arranged on these guides. These guides have only to be able to move the engaging member forward and rearward. Furthermore, the engaging member has only to be able to engage with the article to move it forward and rearward. Accordingly, the engaging member need not have a sufficient width or length to stably place the article on itself. The engaging member also need not support the weight of the article. Furthermore, the moving and fixed guides need not have a sufficient width to stably support the article and can thus be made compact. This enables the transfer device to be made further compact.

Furthermore, the first transmission member can move the moving guide forward and rearward. The moving guide can move forward and rearward to drive the second or third transmission member to move the engaging member forward and rearward relative to the moving guide.

A right and left rows of follower rollers are preferably provided on each of the shelves, to and from which the article is transferred from and to the platform. Preferably, these rows of follower rollers can be connected to the rows of follower rollers on the platform. Then, the load of the article being transferred can be received by the follower rollers of both platform and shelf.

This prevents the transfer device from undergoing an offset load. When the transfer device does not undergo any offset loads, its required rigidity can be reduced to allow its weight to be reduced more easily. Furthermore, the platform is not inclined forward or rearward during a transfer. This allows the platform to be easily guided forward and rearward.

DETAILED DESCRIPTION OF THE PREFERRED EMBODIMENTS

Figure 4:
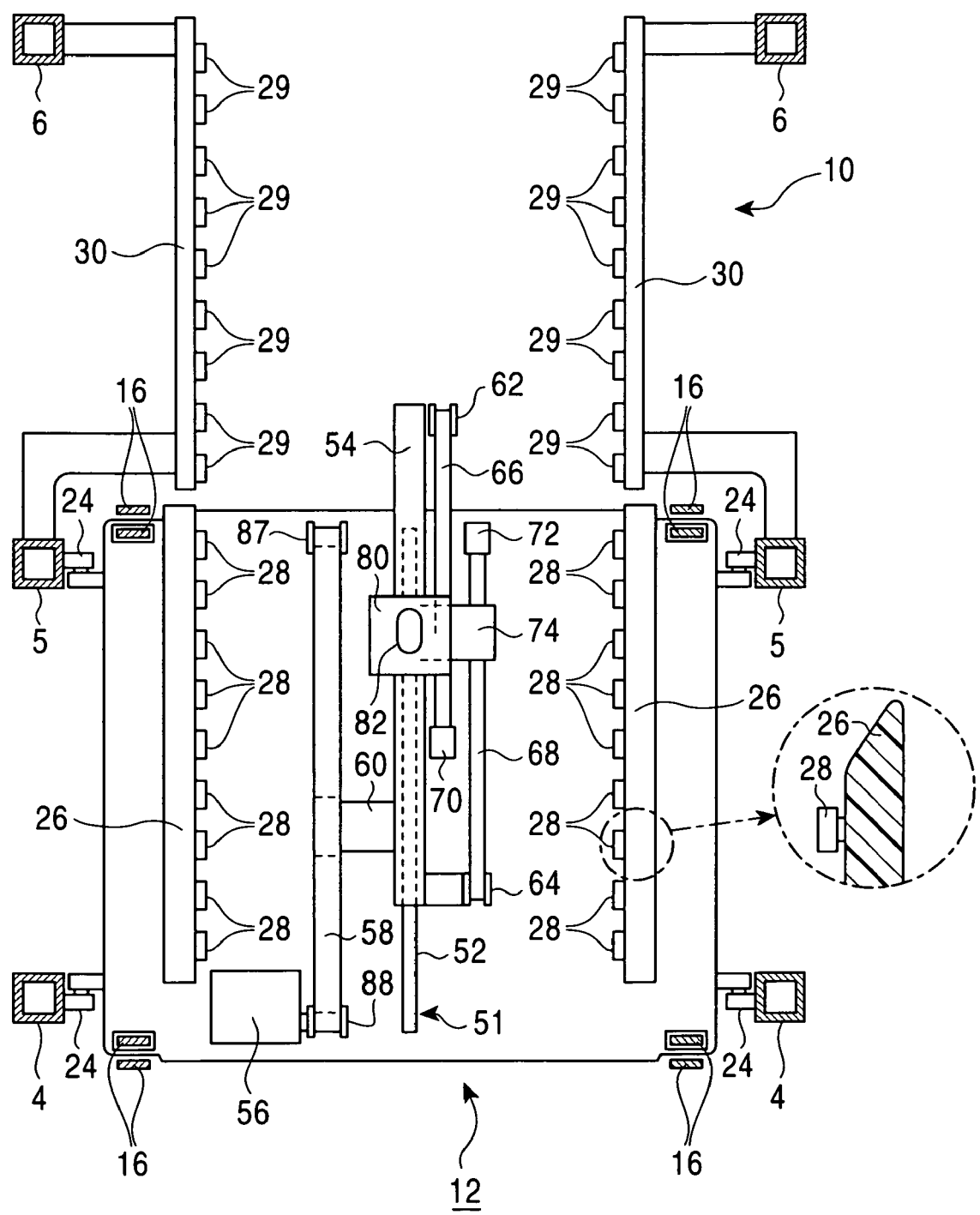
FIG. 4 is a plan view of a platform in the stocker according to the embodiment.
Figure 5:
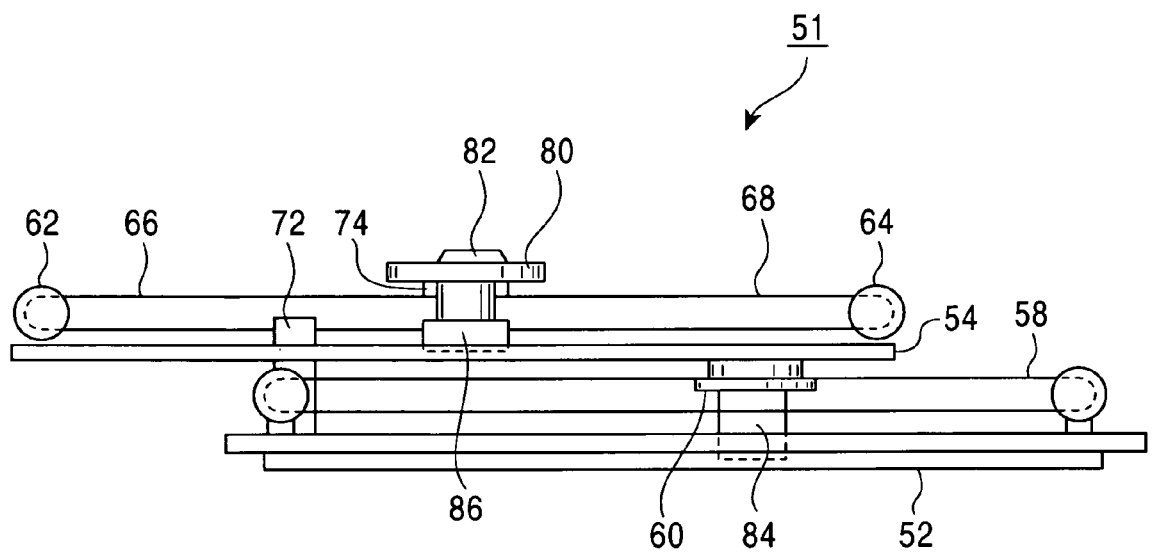
FIG. 5 is a side view schematically showing a transfer device in the stocker according to the embodiment.
Figure 6:
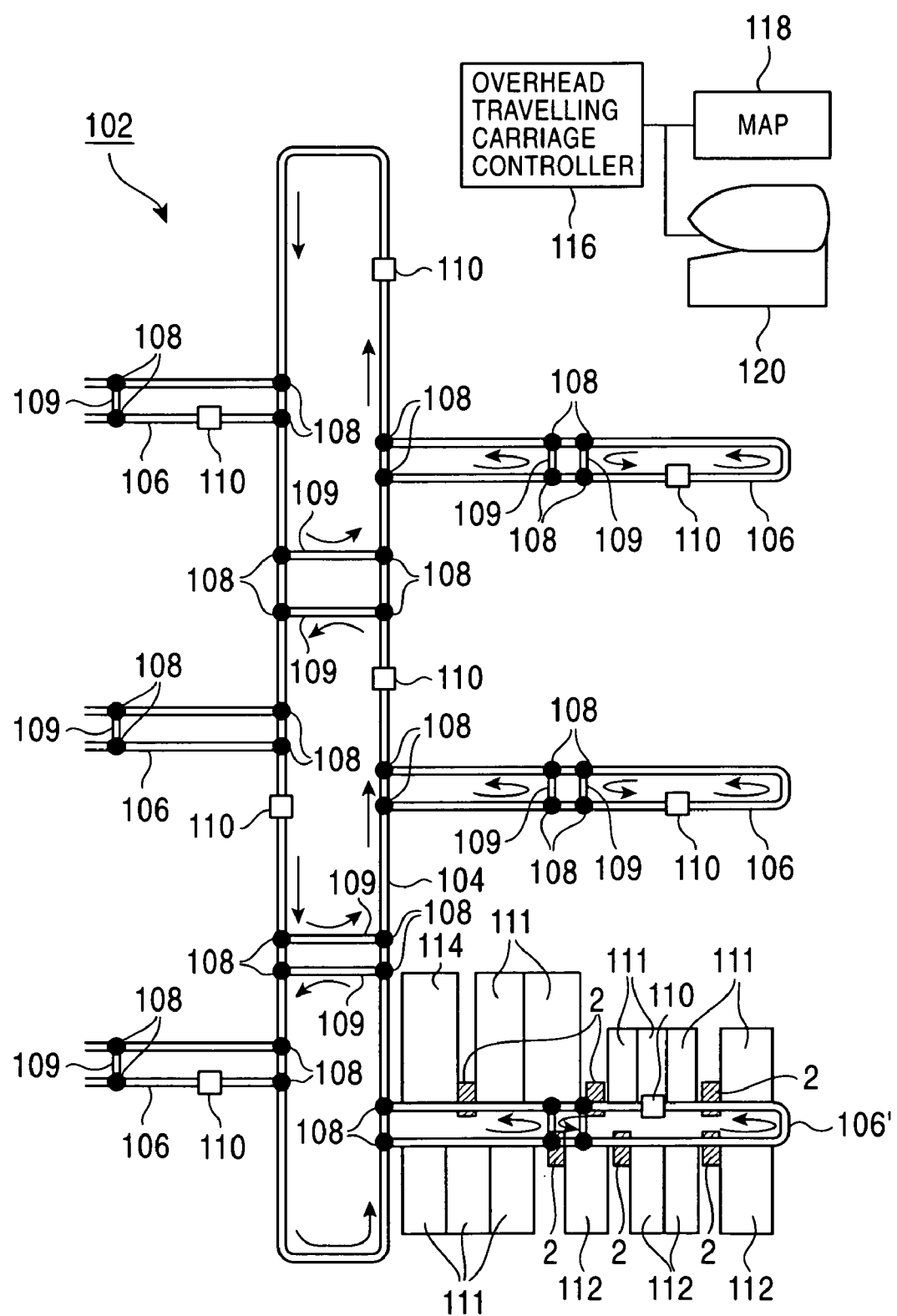
FIG. 6 is a view showing the layout of an overhead travelling carriage system according to the embodiment.
Figure 7:
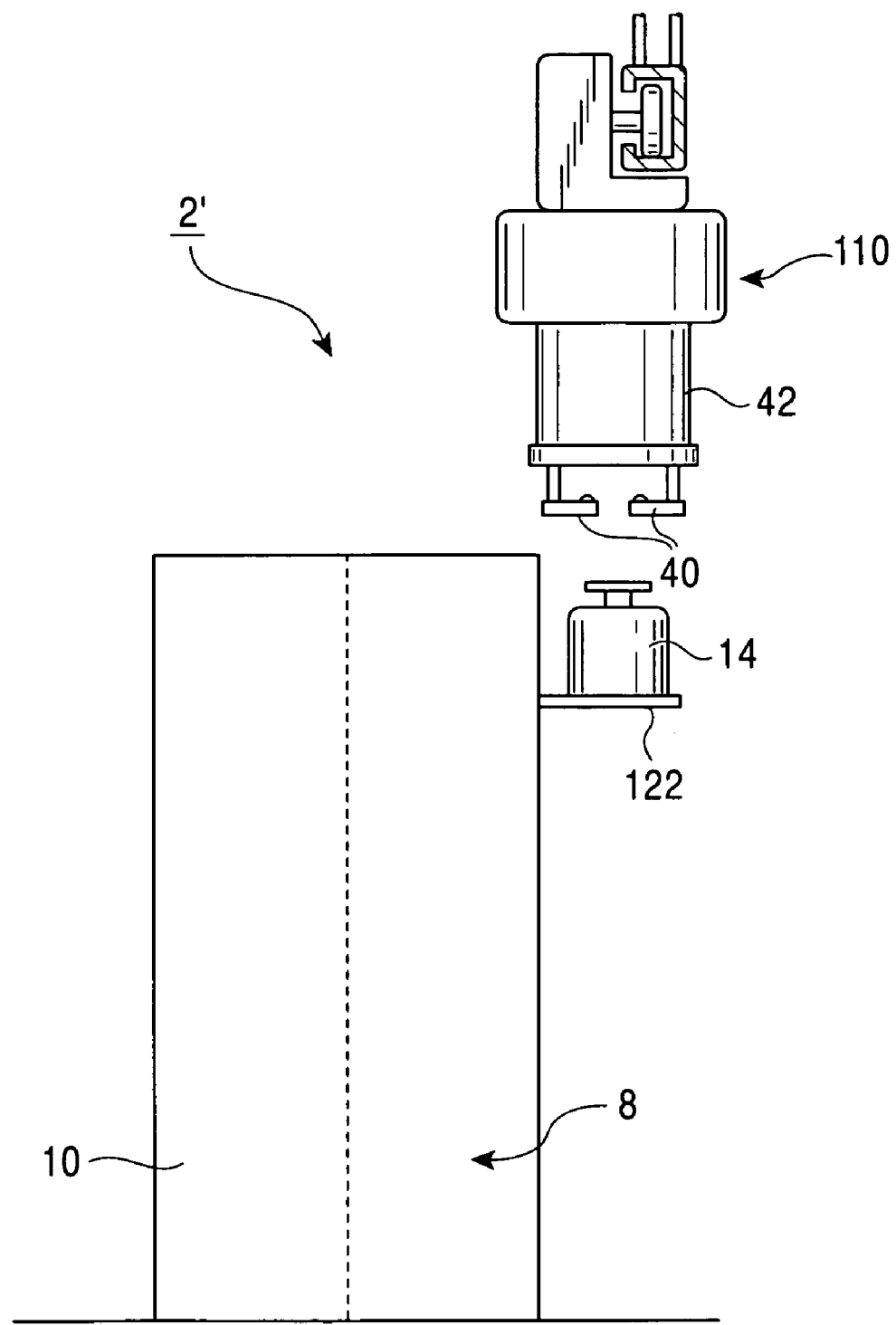
FIG. 7 is a side view showing a stocker according to a variation of the embodiment.

FIGS. 1 to 7 show an embodiment and its variation. FIGS. 1 to 5 show a stocker 2 used in an overhead travelling carriage system. FIG. 6 shows a layout of an overhead travelling carriage system 102. FIG. 7 shows a stocker 2' according to the variation of the embodiment. In these figures, 3 is a frame and 4, 5, 6 are struts. For example, for each of the struts 4, 5, 6, a lateral pair of struts is provided. 8 is an elevating space, and 10 is a storage space, respectively. In the storage space 10, a plurality of shelves are arranged in a line in a vertical direction. The elevating space 8 is provided along the storage space 10. A platform 12 is elevated and lowered along the storage space 10. 14 is a cassette which accommodates semiconductor substrates or the like and which is an example of an article stored in the stocker 2. The stocker 2 is arranged in, for example, a clean room and used as a buffer that stores articles for the overhead travelling carriage system.

The stocker 2 comprises a row of shelves and the platform 12 that does not run but elevates and lowers along the shelves. The platform 12 (elevating space 8) and the shelves (storage space 10) are provided on a straight line in a direction orthogonal to the direction in which an overhead travelling carriage runs, as viewed from above. A longitudinal direction of the stocker 2 is orthogonal to the running direction of the overhead travelling carriage. This allows the latitudinal width of the stocker 2 to be reduced. The stocker 2 can thus be arranged in a narrow space between processing devices arranged along a running rail.

Moreover, the elevating space 8 of the stocker 2 is arranged immediately below the running rail. By using a hoist provided on the overhead travelling carriage to elevate or lower an article, the transfer device can transfer the article to and from the elevating space 8.

The platform 12 is elevated and lowered by fixing ends of suspending materials 16 such as belts or ropes to, for example, four or three corners of the platform 12 and using rollers 17, 18, 19 to guide the suspending materials 16 to wind them around respective drums 20 provided at the bottom of the elevating space 8. For the angle at which the suspending materials 16 are wound around the drum 20, the roller 19 makes this angle equal between the suspending materials 16 closer to the strut 4 and the suspending materials 16 closer to the strut 5. 22 is an elevating motor which rotates the drums 20 and which is used for, for example, the four suspending materials (FIG. 2).

Figure 1:
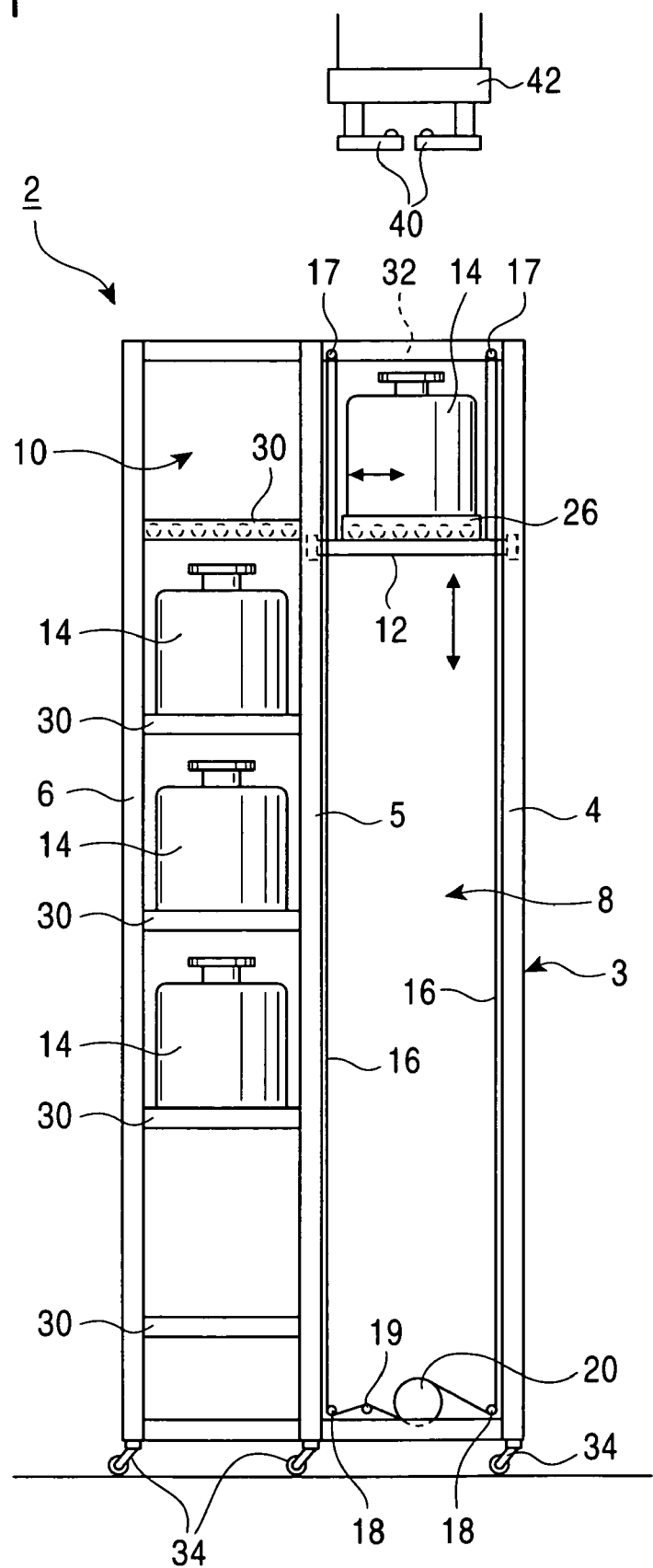
FIG. 1 is a side view of a stocker according to an embodiment of the present invention.

In this specification, the lateral direction of FIG. 1 may be called a forward-and-rearward direction. In particular, the elevating space 8 side may be called a front side, while the storage space 10 side may be called a rear side. Furthermore, the lateral direction of FIG. 2 may be simply called a lateral direction, which is perpendicular to the forward-and-rearward direction of the stocker 2 in a horizontal plane. The suspending materials 16, attached to the respective four corners of the platform 12 are wound around the lateral pair of drums 20, 20. As shown in FIG. 1, the front suspending member 16 and the rear suspending member 16, constituting a pair, are wound around the same drum 20. The single elevating motor 22 drives the drums 20, 20. The rotation speeds of the right and left drums 20, 20 are the same and are determined by the rotation speed of the common elevating motor 22. The front and rear suspending members 16, 16, constituting a pair, are wound around the same drum 20 at the same winding angle. With these arrangements, the four suspending members 16 have the same winding length, the same feeding length, the same timing used for changing a single winding state to a double winding state, and the like. Therefore, a mechanical mechanism can be used to prevent the platform 12 from being inclined forward, rearward, rightward, or leftward.

As shown in FIG. 4, guide rollers 24 are provided at, for example, the respective four corners of the platform 12. The struts 4, 5 and the like are used as guide rails to regulate the lateral position of the platform 12. If the forward-and-rearward direction of the platform 12 must be accurately regulated, then for example, the platform 12 may be guided by also contacting guide rollers on the platform 12 with, for example, those surfaces of the struts 4, 5 which are different from those used to regulate the lateral position of the platform 12. 26, 26 are guide members provided in the right and left sides (laterally opposite sides), respectively, of the platform 12. The guide members 26, 26 are preferably composed of resin such as Duracon, polyurethane, or Teflon (trade mark), which is lubricious. 28 is guide rollers that are follower rollers in the present embodiment but may be driving rollers. The guide rollers 28 are arranged in a line in the lower part of the inner side of each guide member 26. 30 is supports in the storage space 10. The supports 30 are supported by the struts 5, 6 and arranged in the right and left, respectively, of each shelf. Follower rollers 29 are arranged in a line on the inner side of each support 30.

Figure 2:
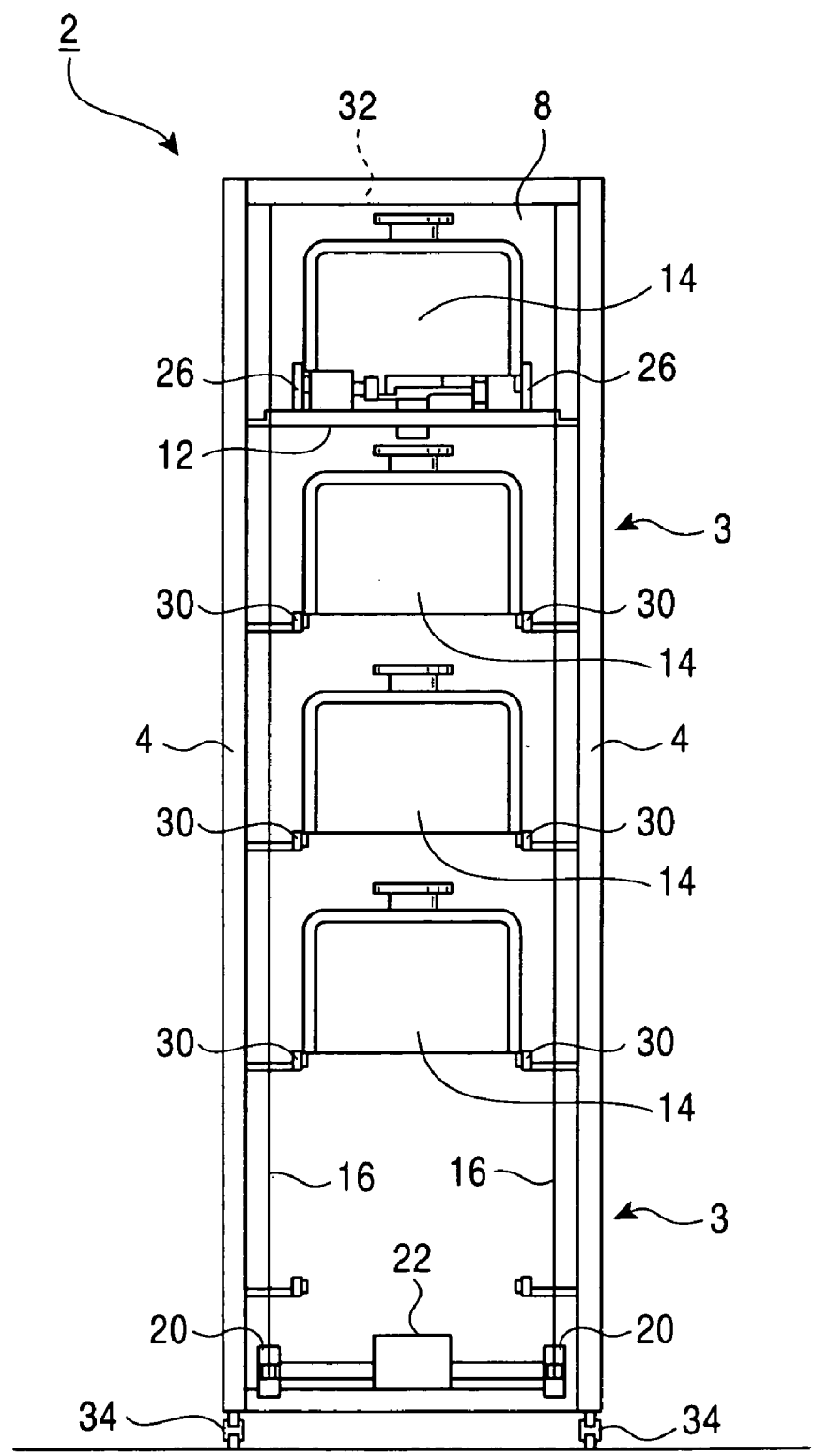
FIG. 2 is a front view of the stocker according to the embodiment.

As shown in FIGS. 1 and 2, an opening 32 is formed at the top of the elevating space 8 as a transfer port to transfer the cassette 14 directly between the overhead travelling carriage and the platform 12. In FIG. 1, 40 is a chuck on the overhead travelling carriage, and 42 is the platform supporting the chuck 40. Thus, in the stocker 2, the opening 32 is formed at the top of the elevating space 8. Furthermore, a ceiling portion of the storage space 10 is, for example, covered. Moreover, the bottom of the stocker 2 is provided with, for example, caster wheels 34 so as to be movable to an appropriate portion. Thus, the stocker 2 can be appropriately moved to and placed in a place where the ability to store cassettes 14 is insufficient. In this case, the entire space of the stocker 2 can be saved, so that the stocker 2 can be installed in a limited narrow space such as the gap between the processing devices and below the running rail for the overhead travelling carriage.

Figure 3:
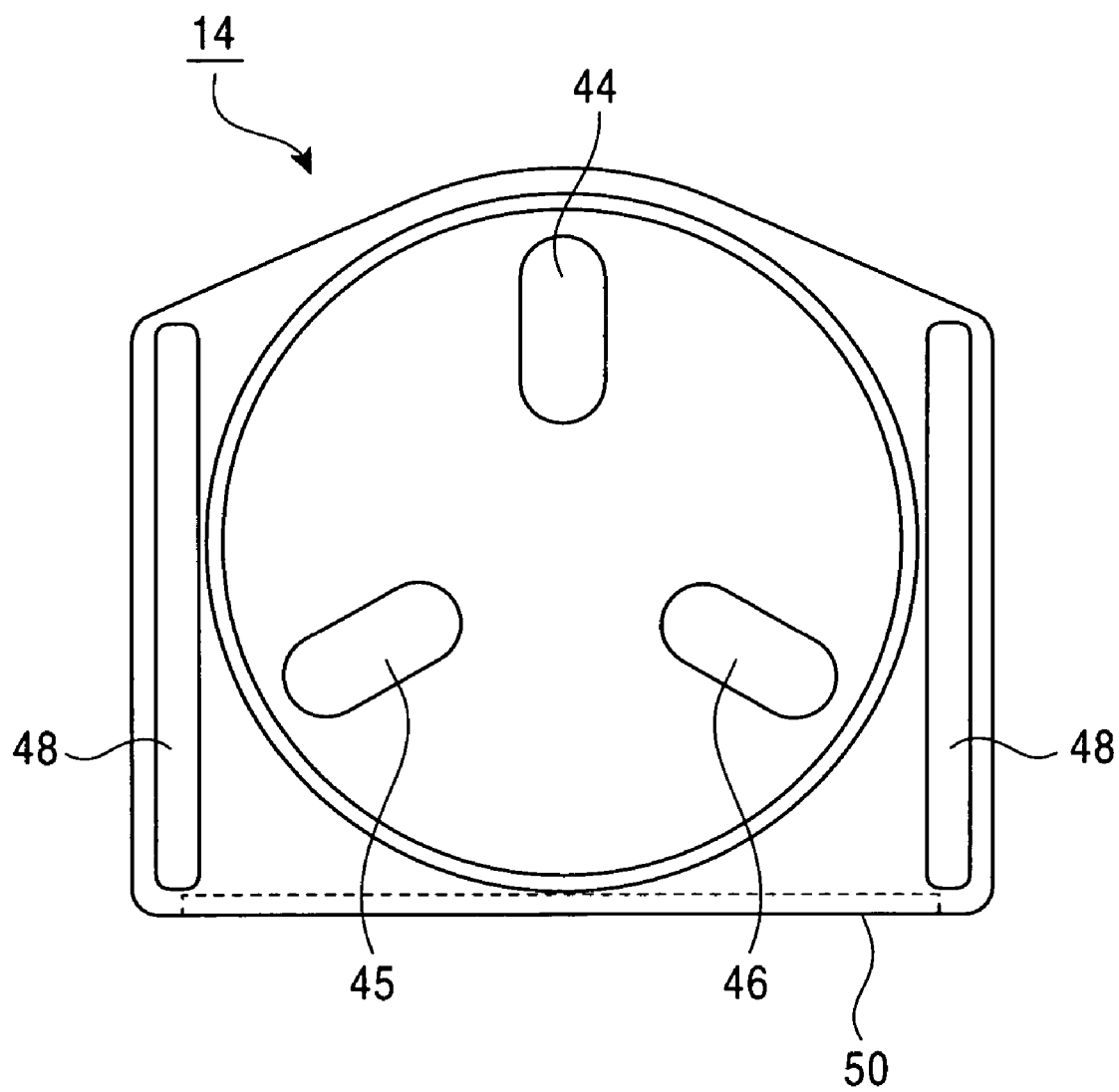
FIG. 3 is a bottom view of a cassette used in the embodiment.

FIG. 3 shows the bottom surface of the cassette 14. For example, three depressions 44–46 are formed at the bottom of the cassette 14. 48 is a lateral pair of projections. A closable cover 50 is provided on the front surface of the cassette 14. In the embodiment, an engaging portion provided on the transfer device is engaged with the laterally central depression 44. Flat portions formed outside the projections 48, 48 are supported by the roller 28 of the platform 12 and the follower roller 29 of the shelf side. Thus, on the platform 12, the weight of the cassette 14 is mostly supported by the rollers 28, and in the storage space 10, by the follower rollers 29. The transfer device of the platform is provided separately from the rollers 28. Accordingly, the transfer device need not support the weight of the cassette 14. This serves to reduce the weight of the transfer device.

When the cassette 14 is unloaded from the overhead travelling carrier, it is positioned in the lateral direction by using the guide members 26, 26, provided on the opposite sides of the platform 12, to guide the cassette 14 in the lateral direction and engaging the engaging projection of the transfer device side with the depression 44 in the cassette 14. The projections 48 of the cassette 14 project inside and below the rollers 28 to regulate the laterally opposite sides of the cassette 14. Since the projections 48 are present inside the rollers 28, the cassette 14 is stably supported on the rollers 28. This also applies to the supports 30 side for the shelves. Each support 30 is slightly higher than the top surface of each follower roller 29. Accordingly, the supports 30 and the projections 48 of the cassette 14 cooperate in preventing the cassette 14 from falling.

FIGS. 4 and 5 show a transfer device 51 provided on the platform 12. A linear guide (direct-acting guide) 52 is fixed to a floor plate, frame, or the like of the platform 12. A separate linear guide 54 is arranged on the linear guide 52 so as to overlap it in the vertical direction. The lower linear guide 52 guides the upper linear guide 54 so as to move it forward and rearward. 56 is a transfer motor that drives a timing belt 58. The upper linear guide 54 is fixed to the timing belt 58 using a mounting plate 60. As described above, the motor 56 is driven to move the linear guide 54 forward or rearward over the linear guide 52.

Pulleys 62, 64 are attached to the respective ends of the upper linear guide 54. The pulley 62 guides a timing belt 66, whereas the pulley 64 guides a timing belt 68. One end of each of the timing belts 66, 68 is fixed to the floor plate, frame, or the like of the platform 12 using fixing portions 70, 72. The other end of each of the timing belts 66, 68 is fixed to a mounting plate 74 connected to a transfer section 80. An engaging projection 82 is provided on the top surface of the transfer section 80 at a position where it overlaps the two linear guides 52, 54 in the vertical direction. The engaging projection 82 is engaged with the depression in the bottom surface of the cassette 14. 84, 86 in FIG. 5 are guided portions guided by the linear guides 52, 54 to move linearly. The guided portion 84 guides the upper linear guide 54, whereas the guided portion 86 guides the transfer section 80.

Chains may be used in place of the timing belts 58, 66, 68. However, they are not preferable because they increase the amount of dust.

The transfer section 80 has only to be able to use the engaging projection 82 to laterally position the cassette 14 unloaded from the overhead travelling carriage and to move the cassette 14 forward and rearward when the timing belts 58, 66, 68 are activated to transfer the cassette 14. The load of the cassette 14 is supported by the rollers 28, 29. Thus, the motor 56 need not provide high power and the linear guides 52, 54 need not be rigid enough to sustain an offset load imposed when the cassette 14 is transferred. Moreover, the cassette 14 is prevented from being inclined by means other than the placement of the cassette 14 on the transfer section 80. Accordingly, the transfer section 80 need not be large compared to the bottom surface of the cassette 14. For example, it may have a length or width one-third or less of the length or width of the cassette 14. Since it is unnecessary to consider the moment of a lateral force exerted on the transfer section 80 by the cassette 14, the linear guides 52, 54 need not be wide in the lateral direction. These arrangements serve to reduce the weight of the transfer device 51. The timing belt 58 is parallel with the linear guides 52, 54, whereas the timing belts 66, 68 are parallel with the linear guide 54.

When the cassette 14 is unloaded from the overhead travelling carriage onto the platform 12, the guide members 26 guide the cassette 14 so as to regulate its position in the lateral direction. The engaging projection 82 is then engaged with the depression 44 in the bottom surface of the cassette 14 for positioning. The weight of the cassette 14 is supported by the rollers 28. If the cassette 14 is transferred, the platform 12 is elevated or lowered to a desired position. Then, in this case, the four suspending materials 16 are wound around or unwound from the drums 20, 20 at the same winding angle using the common elevating motor 22. This prevents the platform 12 from being inclined in the lateral or front-to-rear direction.

Once the platform 12 elevates or lowers to the desired position, the motor 56 drives the timing belt 58. Correspondingly, the upper linear guide 54 moves forward or rearward relative to the lower linear guide 52. Each of the timing belts 66, 68 has one end fixed to the platform 12 using the fixing portions 70, 72, respectively, and an intermediate portion guided by the pulleys 62, 64, respectively, attached to the linear guide 54. Accordingly, the transfer section 80 moves forward or rearward relative to the linear guide 54. The ratio of the stroke of the linear guide 54 to the stoke of the transfer section 80 is, for example, 1:2. The pulley 62 and the timing belt 66 cooperate in moving the transfer section 80 forward. On the other hand, the pulley 64 and the timing belt 68 cooperate in moving the transfer section 80 rearward. Since loads imposed during a transfer are supported by the rollers 28, 29, the platform 12 is not inclined forward or rearward even if any offset load is imposed on the transfer device. Thus, the platform 12 can be easily moved forward or rearward. In this connection, in place of the transfer device 51 in the embodiment, an ordinary slide fork or the like may be driven using timing belts, chains, or the like.

Operations of the embodiment will be described.

Since the stocker 2 is provided with the caster wheels 34, it can be arranged below the running rail for the overhead travelling carriage at an appropriate position to enhance the ability to store cassettes 14. The cassettes 14 can be transferred between the stocker 2 and the overhead travelling carrier using the opening 32, formed at the top of the elevating space 8. Accordingly, no stations project from the stocker 2, thus further saving space. Furthermore, the stoker 2 does not employ the method of moving all the shelves as in circulating shelves but moves the platform 12 and the transfer device provided on the platform 12. It is thus possible to reduce the number of mechanism parts as well as the size and weight of the system and to save space. In this case, the platform 12 is prevented from inclining in the front-to-rear direction or lateral direction by using the single elevating motor 22 to wind or unwind the four suspending materials 16. These arrangements serve to simplify the elevating mechanism of the platform 12.

If the cassette 14 is unloaded from the overhead travelling carriage, the guide members 26 smoothly guide the cassette 14 and engage the engaging projection 82 with the depression 44 for positioning. The load of the cassette 14 is supported by the rollers 28, and in the storage space 10, by the follower rollers 29. Accordingly, a force sufficient to move the cassette 14 forward and rearward has only to be transmitted through the engaging projection 82. This enables reductions in the size and weight of the transfer device. In particular, an offset load that may be imposed during transfer is not applied to the platform 12. These arrangements serve to reduce the weight of the platform 12, thus allowing it to elevate and lower easily. To minimize the amount of dust from the transfer device 51, it is possible to install appropriate covers for the timing belts 58, 66, 68 and to allow the connection plates 60, 74 to move along slits formed in the sides of the covers. The linear guide 54 and the transfer section 80 may be moved forward and rearward using ball screws or the like.

In the present embodiment, the hoist from the overhead travelling carriage is used to transfer the cassette 14 directly between the overhead travelling carriage and the platform 12. However, for example, a pair of support members may be provided above or below the opening 32 to temporarily support the cassette 14, the support members supporting the bottom surface of the cassette 14 and approaching each other and separating from each other in the horizontal direction. When the cassette 14 is transferred between the overhead travelling carriage and the support members, the support members are brought close to each other so that the spacing between the support members becomes narrower than the width of the bottom surface of the cassette 14. If the cassette 14 on the support members is transferred to the platform 12, the platform 12, located below the support members, is elevated to lift the cassette 14 above the support members. The support members are then separated from each other so that the spacing between the support members becomes wider than the width of the bottom surface of the cassette 14. Then, the platform 12 is lowered. On the other hand, if the cassette 14 on the platform 12 is transferred to the support members, the support members are separated from each other with the platform 12 located above the support members. The cassette 14 is then elevated until its bottom surface lies above the support members. Then, the support members are brought close to each other, and the platform 12 is lowered. In this manner, even if the platform 12 is in operation, the overhead travelling carriage can transfer the cassette 14 to and from the support members. If the platform 12 is not in operation, the cassette 14 can be transferred directly between the overhead travelling carriage and the platform 12 without being supported on the support members.

FIG. 6 shows the layout of the overhead travelling carriage system 102. The overhead travelling carriage system 102 is assumed to be installed in a clean room of a semiconductor plant, a liquid crystal display plant, a chemical plant, or the like. 104 is a main route as a base. 106 is a bay route branched from the main route 104 using a branching member 108. 109 is a bypass route. Each of the routes 104, 106, 109 is composed of a running rail mounted on the ceiling of the clean room. An overhead travelling carriage 110 runs along the routes 104, 106, 109 utilizing the branching members 108. The main route acts as a trunk line and connects the plurality of bay routes 106 together. The bay route 106 is used to convey the cassette 14 (article), for example, within one process. The routes 104, 106, 109 are one-way routes.

The arrangement of processing devices and the stokers 2 is shown on a bay route 106'. 111~114 are processing devices. The processing device 111 requires a standard processing time. The processing device 112 requires a shorter processing time. The processing device 114 requires a longer processing time. The stocker 2 is disposed below the bay route 106 or another route so that the elevating space 8 is located immediately below the route 106 or another route. Furthermore, a line composed of the elevating space 8 and the storage space 10 is arranged perpendicularly to the route 106 or another route. The stocker 2 is preferably disposed in the gap between the processing devices. The stocker 2 can be moved using the caster wheels 34 or the like and can thus be easily installed and removed.

The stocker 2 is used to improve the ability to store articles in process in increasing the productivity by for example, installing additional processing devices, modifying existing processing devices, or changing a production schedule. Thus, it is important to be able to dispose the stocker 2 in the gap between the processing devices. Furthermore, the stocker 2 is often installed after the overhead travelling carrier system 102 has been introduced. It is thus important to allow the stocker 2 to be easily installed and removed. To increase the productivity, priority in provision of the stocker 2 is given to the processing device requiring a relatively shorter processing time, so that bottlenecks are likely to occur if articles cannot be supplied promptly to these processing devices. In particular, the stocker 2 is installed upstream of these processing devices. This advantageously allows articles to be unloaded promptly from the overhead travelling carriage 110 so that the overhead travelling carriage 110 can execute the next conveyance instruction. Furthermore, preferably, priority in provision of the stocker 2 is also given to the processing devices requiring a relatively long processing time. This is because this processing device processes a large number of articles at a time and because it is difficult to additionally install a large number of stockers in facilities as valuable sources. Also in this case, the stocker 2 is preferably disposed upstream of the processing device 114 requiring a relatively long processing time.

116 in FIG. 6 is an overhead travelling carriage controller that dispatches station information such as the position and height of a station to the overhead travelling carriage 110. 118 is a map that stores the positions and heights of stations. 120 is an input and an output. Since the stocker 2 is appropriately installed and removed, when the stocker 2 is installed, for example, one overhead travelling carriage 110 is used to manually teach how to transfer the article between the overhead travelling carriage 110 and the platform 12. Transfer conditions obtained (the position and height at which the article was transferred) are registered in the map 118. The position and height of the stocker 2 may be registered in the map 118 without any teaching. Upon removal, the data on the stocker 2 is deleted from the map 118. Thus, articles can be delivered and received between the appropriately installed stocker 2 and the overhead travelling carriage 110.

According to the embodiment, in a clean room or the like, the stocker 2 can be disposed in a gap created between additionally installed processing devices. The single stocker 2 can store a plurality of articles. Furthermore, the stocker 2 can be easily installed and removed. The stocker 2 is provided upstream of the processing device 112 requiring a relatively short processing time or the processing device 114 requiring a relatively long processing time. This prevents these processing devices from causing production bottlenecks.

FIG. 7 shows a stocker 2' according to a variation of the embodiment.

In the stocker 2', a station 122 used to deliver and receive an article to and from the overhead travelling carriage 110 is provided opposite the storage space 10 as viewed from the elevating space 8. A transfer device such as a scalar arm or a slide fork is arranged on the platform so as to transfer the article forward and rearward. The transfer device thus transfers the article between the platform and the station 122, and between the platform and the storage space 10. In the other ways, the stocker 2' is similar to the stocker 2, shown in FIGS. 1~5.

The invention claimed is:

1. An overhead traveling carriage system comprising:
   an overhead traveling carriage which runs along a running rail and conveys an article,
   a stocker which delivers and receives said article to and from said overhead traveling carriage, and
   a plurality of processing devices which receive said article,
   wherein said stocker includes an elevating space in which a platform is raised or lowered,
   wherein said stocker includes a storage space in which a plurality of shelves are provided in a vertical direction to store said article,
   wherein said elevating space is disposed nearer to a running path of said overhead traveling carriage than is said storage space, as viewed from above,
   wherein said overhead traveling carriage and said running rail are disposed above said stocker,
   wherein said elevating space and said storage space are of an equal height,
   wherein said elevating space is provided immediately below said running rail, and
   wherein said overhead traveling carriage directly delivers said article to and from said platform.

2. An overhead traveling carriage system according to claim 1, wherein said stocker is disposed adjacent to one of said plurality of processing devices which requires a relatively short time for processing.

3. An overhead traveling carriage system according to claim 1, wherein said stocker is disposed in a gap between two of said plurality of processing devices.

4. An overhead traveling carriage system according to claim 1, further comprising an opening formed at a top of said elevating space to transfer said article.

5. An overhead traveling carriage system according to claim 4, wherein said stocker is disposed in a gap between two of said processing devices.

6. An overhead traveling carriage system according to claim 4, further comprising:
   a transfer device on said platform to transfer said article to and from the storage space, wherein said transfer device is provided with an engaging member that engages with a bottom surface of said article in order to position the article.

7. An overhead traveling carriage system according to claim 6, further comprising:
guide members provided at laterally opposite sides of said platform to guide corresponding sides of said article.

8. An overhead traveling carriage system according to claim 7, further comprising:
rollers provided in a lower part of each of said guide members to support a load of said article, and
follower rollers provided on each of said shelves in said storage space.

9. An overhead traveling carriage system according to claim 8, wherein said transfer device is provided in a central portion between said guide members on said platform.

10. An overhead traveling carriage system according to claim 9, wherein said transfer device further comprises:
a fixed guide fixed to the platform,
a moving guide that moves forward and rearward relative to the fixed guide,
wherein said engaging member moves forward and rearward relative to said moving guide.

11. An overhead traveling carriage system according to claim 10,
wherein said transfer device is moved forward and rearward relative to said fixed guide by a motor to drive an endless first transmission member, said first transmission member being attached to said moving guide, and
wherein said engaging member is moved forward and rearward relative to the moving guide by a second transmission member having one end fixed to the platform, an intermediate portion guided by a guide wheel provided at a tip of the moving guide, and the other end fixed to said engaging member, and
further comprising a third transmission member having one end fixed to the platform, an intermediate portion guided by a guide wheel provided at a proximal end of the moving guide, and the other end fixed to said engaging member.

12. An overhead traveling carriage system according to claim 1, wherein a longitudinal direction of said stocker is orthogonal to the running direction of the overhead traveling carriage.

13. An overhead traveling carriage system comprising:
an overhead traveling carriage which runs along a running rail and conveys an article,
a stocker which delivers and receives said article to and from said overhead traveling carriage, and
a plurality of processing devices which receive said article,
wherein said stocker includes an elevating space in which a platform is raised or lowered,
wherein said stocker includes a storage space in which a plurality of shelves are provided in a vertical direction to store said article,
wherein said elevating space is disposed nearer to a running path of said overhead traveling carriage than is said storage space, as viewed from above,
wherein said overhead traveling carriage and said running rail are disposed above said stocker,
wherein said elevating space and said storage space are of an equal height,
wherein said stocker includes a station protruding from said stocker to deliver and receive said article to and from said overhead traveling carriage, and a transfer device arranged on said platform in order to transfer said article forward and rearward.

* * * * *